Figure 1:
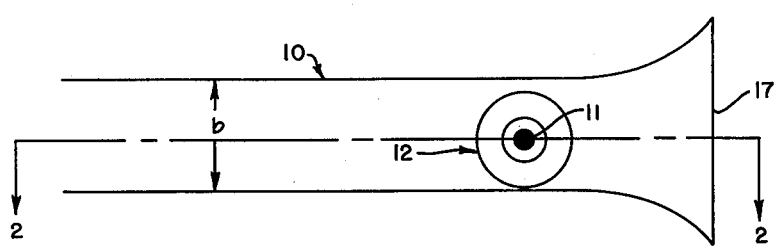

Jan. 6, 1953          R. A. HOWARD          2,624,803

DEVICE FOR MEASURING RADIO-FREQUENCY POWER

Filed Jan. 17, 1946

*INVENTOR*
ROBERT A. HOWARD

BY

*William Ditzel*

*ATTORNEY*

Patented Jan. 6, 1953

2,624,803

UNITED STATES PATENT OFFICE 2,624,803

DEVICE FOR MEASURING RADIO-FREQUENCY POWER

Robert A. Howard, Tulsa, Okla., assignor, by mesne assignments, to the United States of America as represented by the Secretary of War Application January 17, 1946, Serial No. 641,830

7 Claims. (Cl. 178—44)

This invention relates generally to an electrical apparatus and more particularly to a broadband mount for a thermistor element.

In measuring radio frequency power, one method employs a bridge network containing three fixed resistors and a temperature-sensitive resistance. The temperature-sensitive resistance may comprise a thermistor bead which is a substance including nickel, manganese and cobalt. The electrical resistance of the thermistor bead increases approximately exponentially as the internal temperature of the bead decreases. The internal temperature of the thermistor bead is a function of the ambient temperature, of the electrical power (either A.-C. or D.-C.) applied, or of the radio frequency (R.-F.) power absorbed by the bead.

In some applications where radio frequency power is to be measured, the thermistor bead is suspended across a wave guide at a point located a short distance from the short-circuited terminating end of the guide. Assuming the length of the guide has been adjusted for minimum standing wave ratio within the guide, it is desirable to insert the thermistor bead at such a point as to prevent the standing wave ratio from being adversely affected. One method is to insert the thermistor bead at a point in the guide where the apparent susceptance of the guide (looking toward the short-circuited end) is approximately equal and opposite to the susceptance introduced by the thermistor bead along with its lead-out connections at the wavelength of the radio frequency energy in the guide.

The susceptance of the thermistor bead will vary as the wavelength of the applied frequency changes. Also, the apparent susceptance of the wave guide at the point described above will vary with frequency, although at a different rate. Therefore, although the thermistor bead is properly located for one frequency, it may not be so located for any other frequency, thus causing an increase in the standing wave ratio in the later case. Accordingly, it is an object of this invention to mount a thermistor bead in a wave guide so that it will not adversely affect the adjustment of the guide when the applied frequency is varied over a definite range. Achievement of the above object will then provide a so-called broad-band thermistor bead mount.

Figure 2:
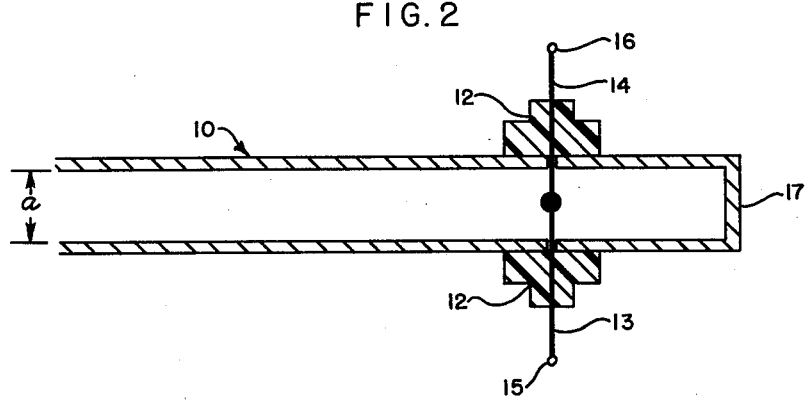

Other objects, features and advantages of this invention will suggest themselves to those skilled in the art and will become apparent from the following description of the invention taken in connection with the accompanying drawing in which:

Figs. 1 and 2 are different views of a thermistor bead mount embodying the principles of this invention.

Referring to Fig. 1, rectangular wave guide 10 is included in a system in which the radio frequency power is to be measured. The wide dimension $b$ of the wave guide is shown in Fig. 1. Near the end of wave guide 10 the dimension $b$ is gradually increased. The opposite sides of the wave guide having a dimension $a$, not shown in Fig. 1, are bent outwardly to conform with said flared construction and form a so-called "fish-tail" section.

Approximately three quarters of a wavelength (at a center frequency) from the short circuited terminating end of the "fish-tail" section, thermistor bead 11 is suspended in mounting assembly 12. Mounting assembly 12 is not necessarily located at the mid-point of the wide side having a dimension $b$.

Fig. 2 is a sectional view taken along the line 2—2 in Fig. 1. The narrow dimension $a$ of the wave guide is shown in Fig. 2. Thermistor bead 11 is suspended within the wave guide approximately midway between the two parallel sides having the dimensions $b$ by means of two wires 13 and 14. Suspension wires 13 and 14 project through holes cut in the wave guide and are sealed in the mounting assembly 12. Mounting assembly 12 should be of a dielectric material to prevent the suspension wires from being shorted to the sides of the wave guide.

The suspension wires 13 and 14 are attached to the thermistor bead in such a manner as to make the bead effectively in series with the wire. The external circuit in which the thermistor bead is to be an element is connected to terminals 15 and 16 of suspension wires 13 and 14, respectively.

The wavelength at which energy of a particular radio frequency is propagated within a wave guide is different than it would be if propagated in free space. In a rectangular wave guide the wavelength $\lambda$ for a given frequency, $f$, is given by the equation:

$$\lambda = \frac{2\pi}{\sqrt{\left(\frac{\omega}{V}\right)^2 \left(\frac{n\pi}{a}\right)^2 \left(\frac{m\pi}{b}\right)^2}} \quad (1)$$

where, $\omega = 2\pi f$ $V$ = velocity of propagation of a wave in free space.

$n$ and $m$ are integers defining the mode.

$a$ and $b$ are wave guide dimensions.

It can be seen from Equation 1 that the rate of change of wavelength with frequency in a wave guide is different for guides of different sizes. If the dimension $a$ is fixed and the dimension $b$ is changed in such a way as to result in a "fish-tail" section as shown in Fig. 1, then the wavelength-versus-frequency variation will change accordingly. A modification of the wavelength is equivalent to a modification of the apparent susceptance at the point in the guide where the thermistor bead 11 is suspended. The actual shape and size of the "fish-tail" section is best determined by empirical means such that over a considerable bandwidth the apparent susceptance of the guide cancels the susceptance of the thermistor bead. It has been found by experimentation that the outwardly diverging sides of the "fish-tail" section may be of a circular arc construction, tangent to the straight sides of the wave guide but not tangent to the terminating end.

It was mentioned before that the thermistor bead 11 is not necessarily mounted at the midpoint of the wide side $b$. It has been found by experimentation that when the bead 11 is located at a properly chosen off-center point, the broadbanding effect is aided.

It can be shown that a wave will be propagated down a rectangular wave guide without attenuation if:

$$\omega^2 \mu \epsilon > \left(\frac{n\pi}{a}\right)^2 + \left(\frac{m\pi}{b}\right)^2 \quad (2)$$

where, $\mu$ = permeability of the transmitting medium.
$\epsilon$ = permittivity of the transmitting medium.
and the other terms are as previously defined.

The dimension $b$ of the wave guide is usually chosen so that no mode higher than the $H_{01}$ mode will be propagated without attenuation. The $H_{01}$ mode is characterized by a unique relation between the electrical and magnetic fields within the guide as is familiar to those skilled in the art. In the present invention, since the wave guide flares out at the terminating end, the higher modes are attenuated only slightly. If the "fish-tail" section is properly flared, there may be no attenuation for the higher modes in the region of the terminating ends.

For these higher modes the "fish-tail" section may then approach the condition of a resonant cavity, since there will be reflections at both ends in this region for these modes. A resonant cavity, like a resonant circuit, has a sharp change of susceptance with changes of frequency in the vicinity of resonance. The susceptance-versus-frequency variation of the resonant cavity within the "fish-tail" section of the wave guide aids in cancelling the susceptance of the thermistor bead 11 and hence there is an additional broad-banding effect.

In summarizing, the dimension $b$ of the wave guide is modified by the "fish-tail" termination in such a way as to cause the susceptance-versus-frequency variation for the wave guide to partially cancel the susceptance-versus-frequency variation for the thermistor bead. In addition, by mounting the thermistor bead 11 in a slightly off-center position, higher modes are able to exist in the vicinity of the "fish-tail" resonant cavity. The susceptance-versus-frequency variation of the wave guide is thereby further modified and the broad-banding characteristic of the mount is considerably increased.

While there has been described what is at present considered to be the preferred embodiment of this invention, it will be obvious to those skilled in the art that various changes and modifications may be made therein without departing from the scope of the invention.

The invention claimed is:

1. In a device for measuring radio frequency power, the arrangement comprising a rectangularly shaped wave guide including two parallel sides of dimension $a$ and two parallel sides of dimension $b$, larger than $a$, said parallel sides of dimension $b$ having extensions flared outwardly from the center at one end of said wave guide, said paralle sides of dimension $a$ having outwardly diverging portions to conform with said flared construction and to form a flared section, means terminating said flared section in a short circuit, and a temperature-sensitive resistive element having a susceptance that varies with the frequency of the energy supplied thereto, said element being suspended within said guide substantially at right angles to said parallel sides of dimension $b$ and disposed slightly off the mid-point of said parallel sides at a point a predetermined distance from said terminating means.

2. In a device for measuring radio frequency power, the arrangement comprising a rectangularly shaped wave guide including two parallel sides of dimension $a$ and two parallel sides of dimension $b$, larger than $a$; said sides of dimension $b$ having extensions flared outwardly from the center of said wave guide, said parallel sides of dimension $a$ having outwardly diverging portions to form a flared section with said parallel sides of dimension $b$, means terminating said flared section, and a temperature-sensitive resistive element having a susceptance that varies with the frequency of the energy supplied thereto, said element being disposed within said guide substantially at a point where said flared section begins.

3. In a device for measuring radio frequency power, the arrangement comprising a rectangularly shaped wave guide including two parallel sides of dimension $a$ and two parallel sides of dimension $b$, larger than $a$, a flared section at one end of said wave guide, means terminating the end of said flared section in a short circuit, and a temperature-sensitive resistive element having a susceptance that varies with the frequency of the energy supplied thereto, said element being suspended within said wave guide substantially at right angles to said parallel side of dimension $b$ and at a predetermined location in said wave guide.

4. In a device for measuring radio frequency power, the arrangement comprising a wave guide terminated in a flared short-circuited section, and a temperature-sensitive resistive element having a susceptance that varies with the frequency of the energy supplied thereto, said element being suspended within said wave guide at a predetermined location.

5. In a device for measuring radio frequency power, the arrangement comprising a wave guide having a short-circuited end, said wave guide being flared at said short-circuited end, and a temperature-sensitive resistive element having a susceptance that varies with the frequency of the energy supplied thereto, said element being mounted in said wave guide at a predetermined location with respect to said short-circuited end.

6. The arrangement according to claim 5 in which said temperature-sensitive resistive element is positioned at substantially three-quarters of a wavelength from said short-circuited end and is displaced from the center of said wave guide.

7. In a device for measuring radio frequency power, the arrangement comprising a rectangular wave guide flared at one end in the direction of its wider cross-sectional dimension and short-circuited at said flared end, the flare of said flared end conforming with circular arcs tangent to the walls of said wave guide defining said wider dimension, and a temperature-sensitive resistive element having a susceptance that varies with the frequency of the energy supplied thereto, said element being mounted substantially perpendicularly to the walls of said wave guide defining the narrower cross-sectional dimension thereof and at substantially three-quarters of a wave-length from said short-circuited end, said element being displaced from the midpoint between the walls of said wave guide defining said wider cross-sectional dimension.

ROBERT A. HOWARD.

REFERENCES CITED

The following references are of record in the file of this patent:

UNITED STATES PATENTS

| Number | Name | Date |
| --- | --- | --- |
| 2,232,179 | King | Feb. 18, 1941 |
| 2,316,151 | Barrow | Apr. 13, 1943 |
| 2,419,613 | Webber | Apr. 29, 1947 |
| 2,460,401 | Southworth | Feb. 1, 1949 |